Feb. 12, 1929.  1,701,832

P. E. WELTON

RUBBER MASTICATING MACHINE

Filed Sept. 12, 1925  4 Sheets-Sheet 1

Patented Feb. 12, 1929.

1,701,832

UNITED STATES PATENT OFFICE.

PARK E. WELTON, OF AKRON, OHIO.

RUBBER-MASTICATING MACHINE.

Application filed September 12, 1925. Serial No. 55,940.

This invention is concerned with rubber working machinery, and more particularly to that class of machinery, known in the art as rubber mixing or compounding machines.

The general object of my invention is the provision of a compact rubber mixing or masticating machine for compounding ingredients with raw rubber which by reason of the compact arrangement of its operating elements may be utilizable in the manufacturing plant in combination with so-called rubber milling or calendering machines whereby the compounded material may be discharged from the mixer directly upon the rolls of the mill.

A further object of my invention is the provision of an arrangement of novel mixing blades in a masticating machine which will enact a rolling, kneading, and cutting action on the mass of rubber and materials being compounded therewith, in several directions whereby a thorough minute intermingling of the crude rubber and materials being compounded therewith may be effected A still further object of my invention is the provision of a novel charging apparatus in combination with a mixing machine of the character referred to, which may be operative at will to forcefully feed the materials, to be compounded, into the mixing chamber of the machine without necessitating an interruption in the mixing operation of the machine.

Other objects of my invention will hereinafter become apparent from the following description referring to the accompanying drawings, illustrating the preferred form thereof. The essential characteristics of my invention are summarized in the claims.

Figure 1:
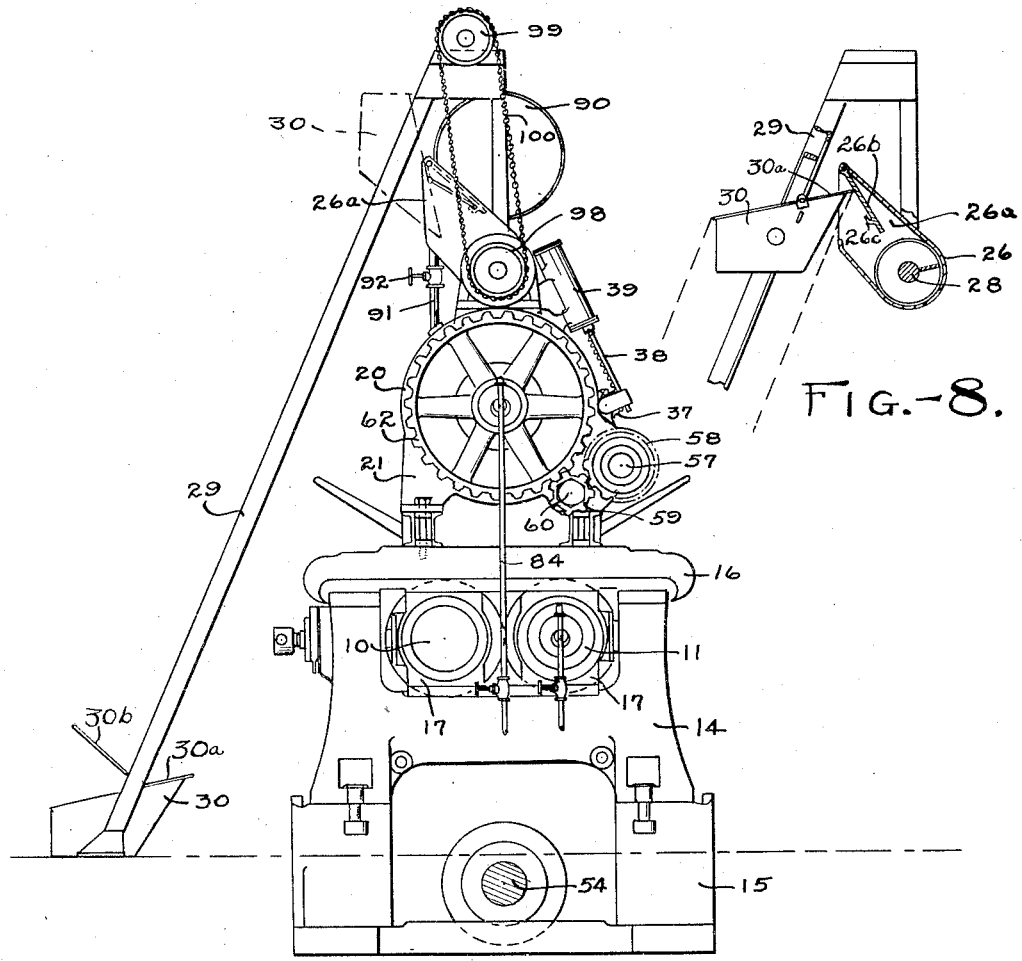
Figure 2:
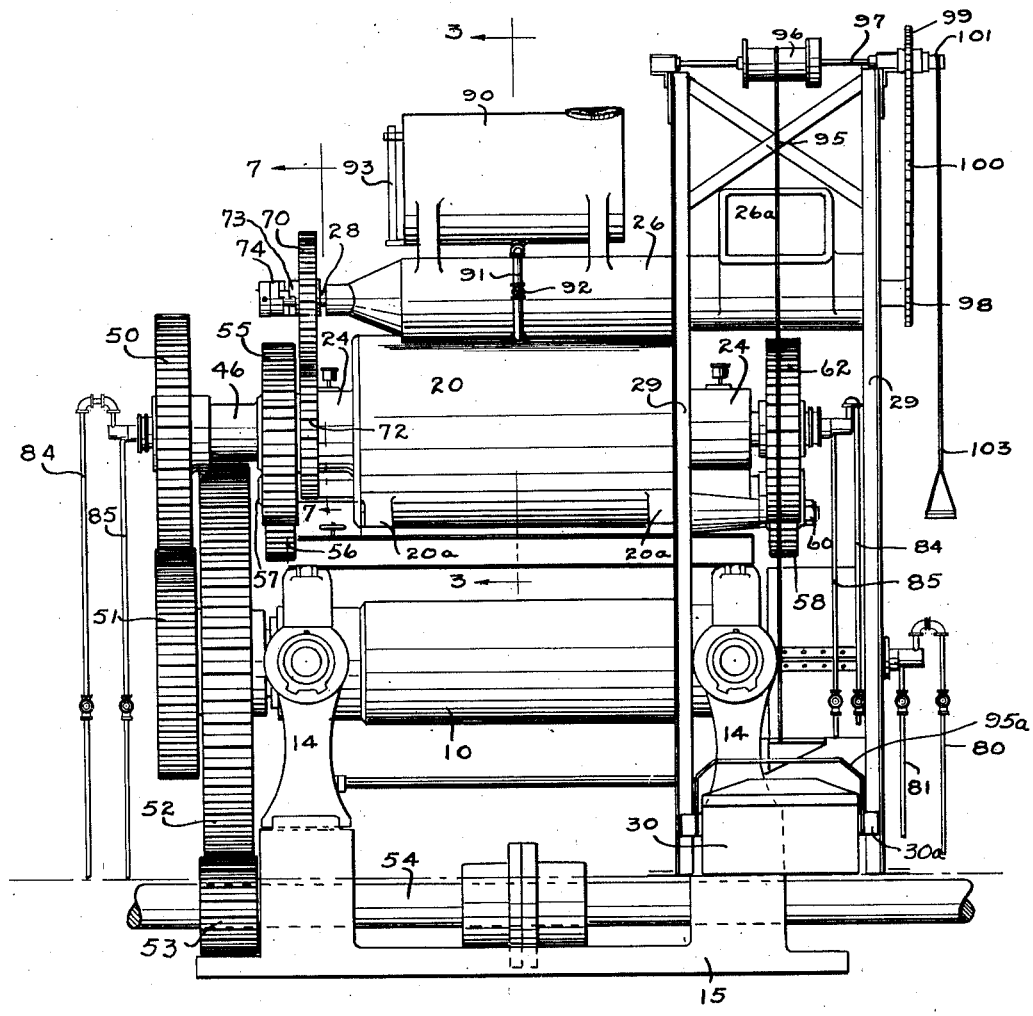
Figure 3:
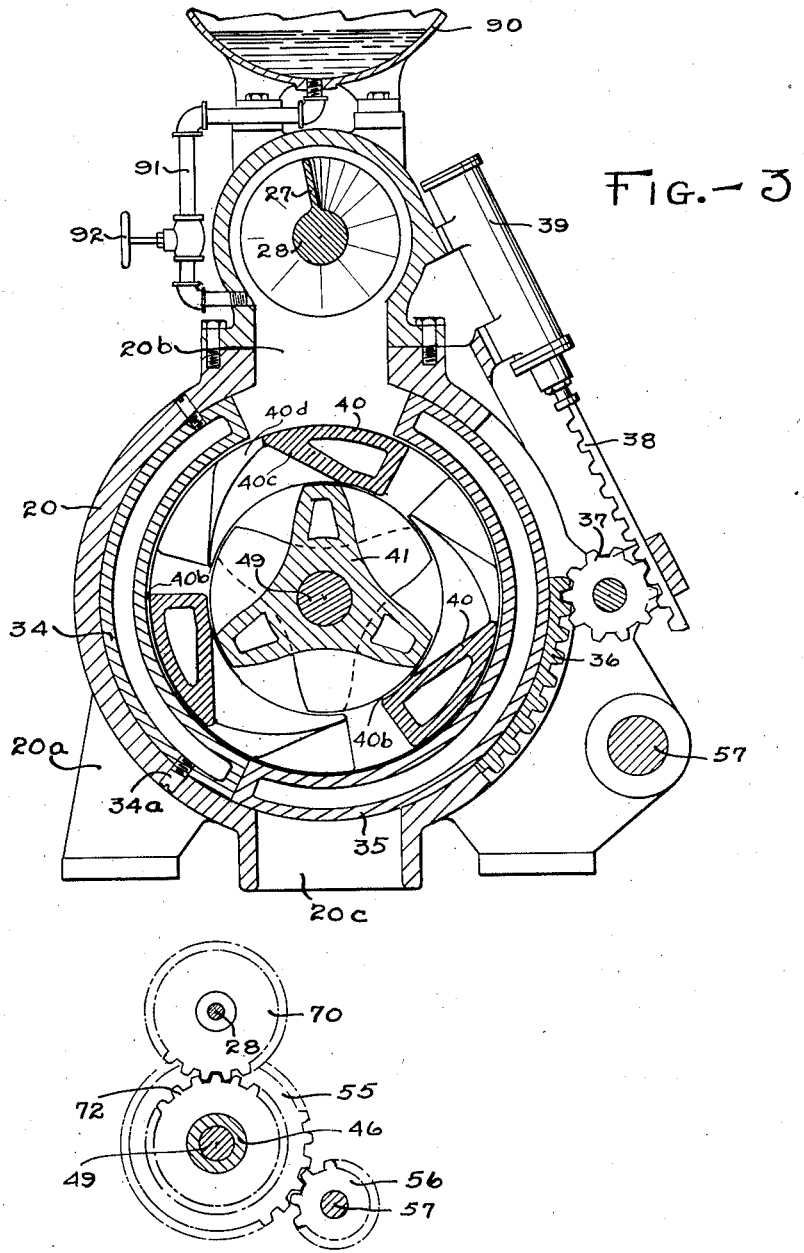
Figure 4:
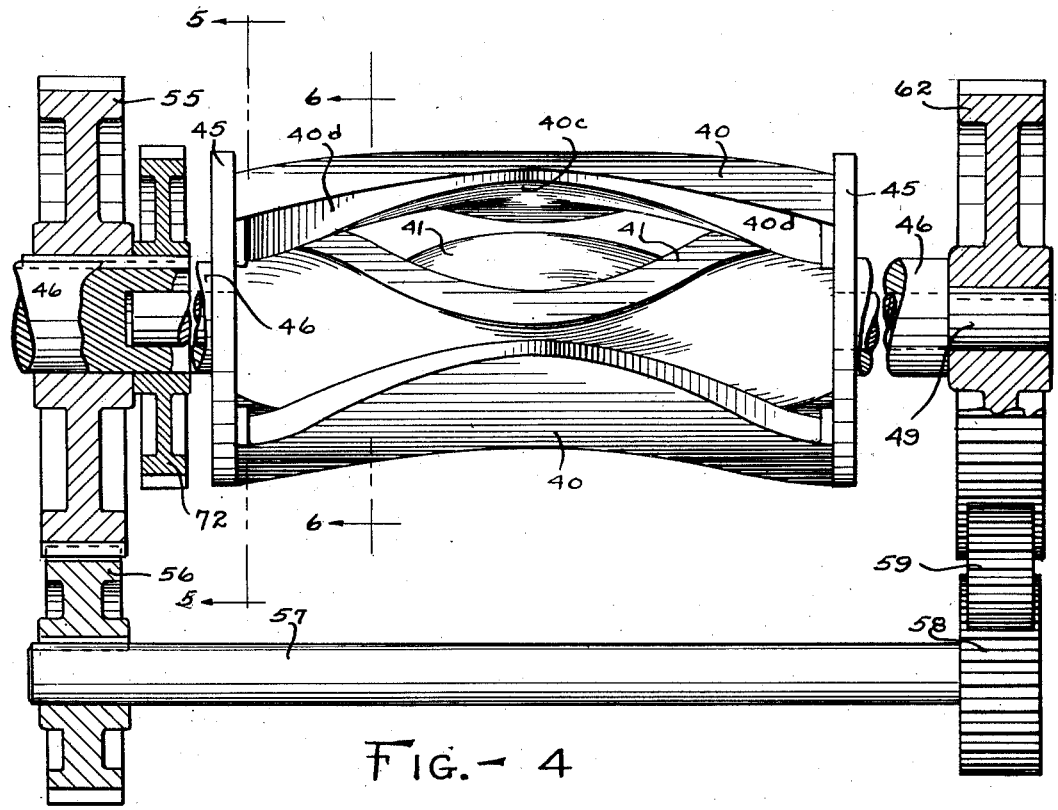
Figures 5, 6:
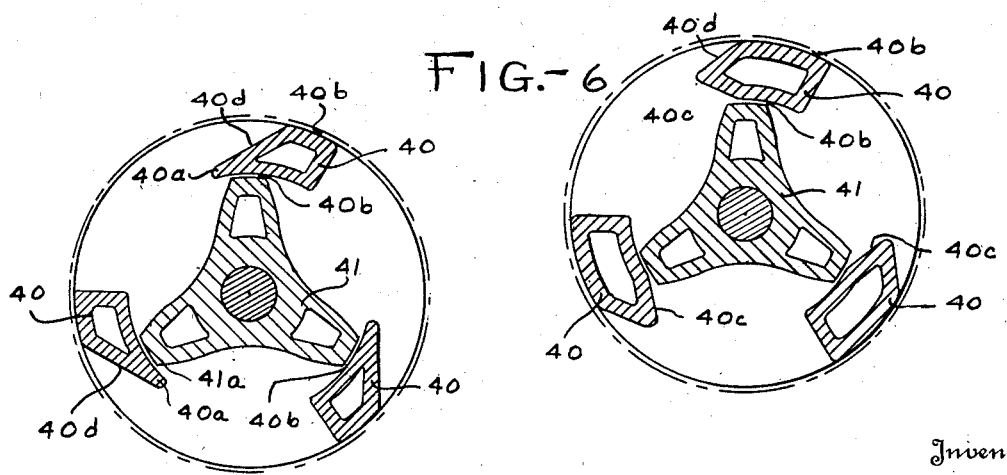

In the drawings, Fig. 1 is a side elevation of a combined mixing machine and mill or calender embodying the novel features of my invention; Fig. 2 is an elevational view of the machine taken from the material charging side of the machine; Fig. 3 is an enlarged cross-sectional view taken substantially along the line 3—3 of Fig. 2, through the mixing machine only; Fig. 4 is an enlarged detail of the mixing blade, shafts, and operating gears therefor; Fig. 5 is an enlarged fragmentary detail taken transversely along the lines 5—5 and 6—6 respectively through the mixing blades and part of the casing, showing the relationship of the blade surfaces and the inner surface of the casing; Fig. 7 is a fragmentary detail of a gear train adapted to drive one of the mixing blade shafts. Fig. 8 is a fragmentary detail of the skip hoist and hopper.

Rubber mixing machinery for compounding rubber while in a raw and unvulcanized state, has been developed along two general principles. One type embodies a worm, into contact with which the stiff material is forced, and the rubber is thereafter worked back and forth in a confined chamber which may be provided with restricted areas to more effectively cause a thorough commingling of the compounding materials. The other type of machine usually embodies parallel shafts in a common chamber with mixing blades, or worms formed thereon, of various designs to effect a thorough kneading of the rubber and compounding materials.

My invention embodies a departure from these principles in that I have two sets of concentrically operable mixing blades rotatable in opposite directions and between which the rubber is kneaded and rubbed, and by the action of which, the compounding of the rubber is expeditiously effected. I embody these rotating elements in an operative structure which is compact and particularly adapted to be operated in combination with so-called milling or calendering machines commonly in use in the rubber industries.

Particularly in Figs. 1 and 2, I show a combined mixing and calendering machine having calendering or milling rolls 10 and 11 mounted on bearing supporting members 14 at each end thereof, the bearing members 14 being mounted on a machine base 15. The bearings for the rolls are usually slidably mounted on the blocks 14 and the latter are provided with top members 16 reacting on the tops of the bearing blocks 17 of the calendering rolls. Surmounting the members 16, is a mixer casing 20 provided with suitable legs 21 affording rigid attachment to the blocks 16 of the mill. The casing 20 has formed at each end thereof, bearing sleeves 24 as shown in Fig. 2 in which mixing blade shafts are rotatably mounted. The shafts carry mixing blades of a special shape as shown in Fig. 4 and which will hereinafter be described in detail.

The mixer casing 20 has mounted thereon, a secondary casing which comprises a feed tube enclosing a feed screw or worm 27 formed on a shaft 28 (Fig. 3) bearing at the ends of the feed tube 26. The feed tube is provided at one end thereof with a material receiving hopper 26ª (see Figs. 1 and 2) into which the raw materials are discharged from a skip hoist bucket 30 which is adapted to ride on rails 29 and discharge material into the hopper.

It is essential in all machines adaptable for the working of crude rubber compounds that the heat generated by the frictional resistance of the rubber be carried out of the machine, and particularly away from the operative parts of the machine that contact with the rubber being compounded, for the reason that any substantial rise in temperature of the rubber will cause a partial vulcanization of the stock being worked, or at least interfere with the subsequent effective reactions of the vulcanizing accelerators now usually embodied in all rubber compounds. The mixer casing 20 however is not provided with a cooling medium, but is provided with an inner lining 34 (Fig. 3) formed in a hollow manner to permit the flow of cooling water therethrough, and this lining is preferably formed in two parts, one part being stationary and rigidly affixed to the interior of the casing, while the other part 35 may be arcuately swingable while in contact with the casing wall. The dimensions of the two lining parts are such that the part 35 may in effect, comprise a door for alternately closing a charging opening 20ᵇ which establishes communication between the feed tube 26 and the interior of the casing 20 and a discharge opening 20ᶜ formed at the bottom of the casing and through which the compounded material may be discharged directly upon the mill rolls 10 and 11. The lining surfaces of the members 34 and 35 are accordingly formed concentric with an interior cylindrical surface of the casing and the lining member 34 may be prevented from movement by securing it to the casing by any suitable means such as bolts or pins 34ª.

The lining member 35 comprising the shiftable door may be provided at one end of the casing with a segment gear 36 meshing with a pinion gear 37 suitably mounted on the frame of the machine as shown in Fig. 3. The gear 37 is preferably operated by a rack bar 38 on the end of which is mounted a double acting piston disposed within a fluid pressure cylinder 39. With such an arrangement, it will be apparent that by controlling the pneumatic pressure on either side of the piston within the cylinder 39, the lining part 35 comprising the door may be caused to alternately open and close inlet and discharge openings 20ᵇ and 20ᶜ respectively.

In Fig. 5, I show in cross section, the relation of the casing lining 34 and 35 to a group of hollow mixing blades 40 formed and mounted to rotate adjacent to the inner surface of the lining and to an inner group of rotating mixing blades 41 which are driven in an opposite direction. It will be noted that the surfaces of the blades, which rotate in juxtaposition to the surface of the lining and to each other, are concentrically formed with sufficient spaces 40ᵇ therebetween whereby the lead faces 40ᵃ and 41ᵃ of the blades in each group may first act to stretch and then gather the raw rubber masses and thereafter guide parts thereof into these spaces whereupon the rubber is subjected to a rubbing, rolling, and snubbing action, thus causing the particles to be thoroughly commingled.

In Fig. 4, I show the blades 40 as being concavely formed in a common direction and with each half blade sloping away from the direction of its rotation and the halves of each blade converging at the middle region of the casing, while the inner set of mixing blades 41 are similarly formed relative to the direction of rotation thereof, but extend or slope in a direction opposite to the direction of rotation of the first set of blades. Thus, the entire set of blades may be formed after the fashion of a revolving cage, rotating around the inner group of blades and each of the latter may comprise a spirally formed rib with the direction of the rib helix reversed at the middle of the blade.

It will be readily understood that by sloping or reversing the blade slope of each group of blades at the middle thereof, in the manner described, the action of the blade surfaces on the rubber tends to gather the rubber from the ends of the mixing chamber and concentrate it at the middle of the mixing chamber. The outer blades 40 may be undercut, (see blade surface 40ᶜ in Figs. 4 and 6) and have the forward faces 40ᵈ thereof slanting toward the cylindrical surface of the mixing chamber whereby the outer blades may more expeditiously guide the rubber to the spaces 40ᵇ which exist between the casing wall and the outer blades and between the outer and inner blades.

It is important that the blades be water-cooled to prevent frictional heat accumulating therein, hence the blades 40 and 41, as shown in Fig. 4, are hollow. The outer blades may comprise bars extending between disk members 45 formed on the hollow shaft extensions 46 which rotatably bear in the hub or sleeve projections 24 of the casing 20. The blades 41 may be spirally formed on an inner shaft 49. The manner of conducting the cooling medium to these blades will be hereinafter described.

The outer blades 40 are driven through the shaft 46 by a gear 50 rigidly mounted thereon and the gear 50 is driven by a gear member 51 mounted upon the shaft of the calender roll 11; the calender roll being driven by a large gear 52 meshing with a pinion 53 mounted on a power shaft 54 extending along the base 15 of the mixing mill.

To drive the inner set of rotating blades 41 in a direction opposite the blades 40, the inner blade shaft 49 is driven through a chain of gears as follows:—As shown in Figs. 2 and 7, a gear 55 is provided on the shaft 46 intermediate the drive gear 50 and an end of the casing 20 which is arranged to drive a gear 56 mounted on a countershaft 57, the latter bearing in suitable bearing brackets formed on the legs 21 of the mixer casing. Upon the opposite end of the shaft 57 is a gear 58 which meshes with an intermediate gear 59 loosely mounted on a stub shaft 60 secured to the casing frame. The intermediate gear 59 meshes with and drives a gear 62 mounted upon the shaft 49 at the opposite end of the mixer casing. This drive through the intermediate gear effects rotation of the inner mixing blades in a direction opposite to that of the outer set of blades 40. To increase the frictional action of the mixing blades upon the material being compounded the respective sets of blades may be rotated at relatively different speeds, as desired. In the present instance, the gear ratios of the respective gear trains described may be such that the inner blades may make one and one-half revolutions to one revolution of the outer mixing blades.

If desired, the main drive gear 50, meshing with the calender roll gear 51, may be connected with the hollow shaft 46 by a clutch whereby the calender rolls may be driven while the mixing machine is idle.

The feed worm 27 may extend the length of the feed tube 26 to force the material against the end of the tube and thus cause it to be forced through the opening 20$^b$ extending along the top of the casing. The worm shaft 28, as shown in Fig. 2 may have a gear 70 mounted on one end thereof, which gear may be driven by a gear 72 rigidly mounted on the shaft 46. The gear 70 may have its hub 73 provided with clutch teeth and may be loosely mounted on the worm shaft 28, and a clutch sleeve 74 is provided on the outer end of the shaft 28 which may be splined to the shaft 28 and permit coupling and uncoupling of the feed worm shaft to the source of power, at will.

As shown in Figs. 1 and 2, the calender rolls may be maintained at the desired temperature by coupling an inlet water line 80 to the hollow interior thereof in a well known manner while the discharge cooling water from these rolls may exit through the line 81. The mixing blades as stated, are hollow, and the supports or shaft disks 45 therefor may also be hollow and communicate with suitable passageways through the respective shafts to afford communication with an inlet pipe line 84 and an outlet line 85 in a well known manner. A separate cooling line is provided for each set of blades at the respective ends of the mixing blade shaft ends as shown in Fig. 2.

I provide a container 90 which may be surmounted upon the feed tube 26 and which may contain fluent substances comprising compounding materials such as accelerators, etc. The contents of this tank may be discharged into the mixing chamber of the casing through a line 91 controlled by a suitable valve 92. A gauge 93 may be provided at one end of the tank 90 and may be graduated in a suitable manner whereby the amount of material being released into the mixing chamber of the casing may be definitely known.

The skip hoist comprising the elevator bucket 30 and supporting rails 29 therefor, may include pivotal mountings 30$^a$ carried on a bail 95$^a$ for the bucket 30, the latter being arranged in slidable engagement with the rails 29 whereby when the bucket is lifted by the taking in of a cable 95 by rotation of a spool or drum 96, the bucket may automatically dump, as shown by the dot and dash line A in Fig. 1, and thus discharge the contents of the bucket into the hopper 26$^a$ of the feed tube.

In Fig. 8, I show the lid 30$^a$ of the bucket 30 impinging against and opening the hopper door 26$^b$. When the bucket is elevated to a higher position than that shown in Fig. 7, it will first tilt to cause the outer edge of the lid 30$^a$ to engage the hook 26$^c$ and a still further upward movement will cause the lid to be swung to an open position as shown in Fig. 1. A second lid 30$^b$ affords easy access to the bucket interior when lowered.

The drum 96, is rigidly mounted upon a shaft 97 provided with suitable bearings affixed to the elevator frame of the skip hoist and the shaft may be driven from the feed worm shaft 28 by sprockets 98 and 99 and chain 100. A clutch, diagrammatically represented at 101 in Fig. 2 may be controlled by a shifter rod 103 for coupling the drum shaft 97 to the sprocket 99 when desired. When the clutch 101 releases the shaft 97 from the sprocket drive, the bucket will drop, due to the influence of gravity.

From the foregoing description of my invention, it will be apparent that by providing a plurality of mixing blades arranged in groups rotatable in opposite directions, but in relatively concentric paths, all parts of the rubber compound batch being mixed are subjected to constant action. The particular shape of the blades as described is quite effective to not only effect the partitioning and recombining of the rubber batch, but there is a kneading and rubbing action effected upon the rubber simultaneously over a plurality of surfaces and the grouping of the operative elements is effected in such manner that the entire apparatus is readily adaptable to combination with a calender or milling machine whereby the material may be discharged directly from the compounding or mixing machine into the calender or mill rolls.

Having thus described my invention, I claim:—

1. In a masticator, the combination of two concentrically operated shafts carrying mixing blades having concentrically formed opposed surfaces of substantial width, and means for rotating the shafts in opposite directions.

2. In a masticator, the combination of two concentrically operated shafts carrying mixing blades, said blades being hollow for water cooling purposes, said blades being shaped to urge the material being masticated toward the central portions of the blades, and means for rotating the shafts in opposite directions.

3. In a masticator, the combination of two concentrically operated shafts carrying mixing blades, the shafts being in bearing contact with each other and the shafts and blades being hollow for water cooling purposes, the blades being shaped to constantly urge the material being acted upon thereby toward the central portions thereof, and means for rotating the shafts in opposite directions.

4. In a masticator, the combination of two concentrically operated shafts carrying mixing blades having concentrically arcuate surfaces the surfaces being of substantial width, and means for rotating the shafts in opposite directions.

5. In a masticator, the combination of two concentrically operated shafts carrying offset mixing blades, said blades being hollow with the cavities thereof communicating with cavities formed in the shafts through passageways formed in means supporting said offset blades, whereby cooling water may be passed therethrough while the shafts are rotated, and means for rotating the shafts in opposite directions.

6. In a rubber masticator, the combination of two concentrically operated shafts carrying mixing blades having concentrically formed surfaces of substantial width and means for rotating the shafts in opposite directions at relatively different speeds.

7. In a rubber masticator, the combination of two concentrically operated shafts carrying mixing blades, and means for rotating the shafts in opposite directions, said blades on one shaft being concave in one direction, and the blades on the other shaft being concave in an opposite direction.

8. In a masticator of the character described, the combination of a casing, means for water-cooling the casing, and a pair of concentrically operated shafts having mixing blades carried thereby, said shaft blades and casing having concentrically formed surfaces between which the rubber is forced by the blades.

9. In a masticator of the character described, the combination of a casing, means for water-cooling the casing, a pair of concentrically operated shafts having mixing blades carried thereby, the blades of said shafts being hollow for water-cooling purposes, the blades being shaped to draw the rubber toward the center of the casing from opposite ends of the casing and means for driving the shafts in opposite directions.

10. In a masticator of the character described, the combination of a casing, means for water-cooling the casing, a pair of concentrically operated shafts having mixing blades carried thereby, the blades of said shafts being hollow for water-cooling purposes, the blades being shaped to draw the rubber toward the center of the casing from opposite ends of the casing and power means including a gear reduction train for driving the shafts in opposite directions at different speeds.

11. In a rubber masticator, the combination of a casing, rubber masticating blades operatively arranged therein, said casing having an opening at the top thereof and an opening at the bottom thereof and a common door for alternately obstructing said top and bottom openings.

12. In a rubber masticator, the combination of a casing, rubber masticating blades operatively arranged therein, said casing having an opening at the top thereof and an opening at the bottom thereof and a common door disposed entirely within the casing for alternately obstructing said top and bottom openings.

13. In a rubber masticator, the combination of a casing, rubber masticating blades operatively arranged therein, said casing having an opening at the top thereof and an opening at the bottom thereof, a water-cooled door for alternately obstructing said top and bottom opening and power means for operating the door.

14. In a rubber masticating machine, the combination of a casing, said casing having a hollow lining and an arcuately shiftable door within the casing for closing a discharge opening of the casing, the door comprising a part of said lining.

15. In a rubber masticating machine, the combination of a casing having an opening formed therein having an arcuately formed door having cavities formed therein for water cooling purposes, shafting and mixing blades thereon disposed within the casing, and power operated means for shifting the door arcuately to close said opening, the door being adapted to comprise reactive means for rubber being acted upon by the mixing blades.

16. In a rubber masticator, the combination of a plurality of concentrically rotatable mixing blades, means for rotating the blades in opposite directions, a casing, a lining within the casing formed to be water cooled, a door comprising part of the lining within the casing, and power means for operably shifting the door to close a discharge opening extending through said lining and the casing.

17. In a rubber masticator of the character described, the combination of a casing, rotary mixing blades mounted within the casing, said casing having an opening adjacent the top thereof, and means for forcefully feeding material into the casing through said opening, said means being adapted to feed the material, first, longitudinally of the axis of rotation of the mixing blades and then radially relative to the mixing blades.

18. In a rubber masticator of the character described, the combination of a casing, rotary mixing blades mounted within the casing, said casing having an opening adjacent the top thereof, and a power driven feed worm for forcefully feeding material into the casing through said opening, said means being adapted to feed the material first longitudinally of the axis of rotation of the mixing blades and means for feeding flowable compounds into the casing at the point of ingress of the material being acted upon by said feed worm.

19. In a rubber masticator of the character described, the combination of a casing, rotary mixing blades mounted within the casing, said casing having an opening adjacent the top thereof, means for forcefully feeding material into the casing through said opening, said means being adapted to feed the material first longitudinally of the axis of rotation of the mixing blades and then radially relative to the mixing blades and a power operated door disposed within the casing for interrupting the feeding of the material through said opening.

20. In a rubber masticator of the character described, the combination of a casing, rotary mixing blades mounted within the casing, said casing having an opening in the top thereof, and means for forcefully feeding material into the casing through said opening, said means being adapted to feed the material first longitudinally of the axis of rotation of the mixing blades and then radially relative to the mixing blade, and power means for driving said blades and said material feeding means.

21. In a rubber masticator of the character described, a casing feeding apparatus arranged exteriorly of the casing for forcefully feeding the material thereinto, concentrically operated shafts carrying blades disposed within the casing, and means for driving said shafts and said feeding device, said feeding device being adapted to feed the material longitudinally of the casing then radially relative to the mixing blades.

22. In a rubber masticator of the character described, a casing, feeding apparatus arranged exteriorly of the casing for forcefully feeding material through an opening therein, concentrically operative shafts carrying blades disposed within the casing, means for driving said shafts in opposite directions and for driving said feeding device, said feeding device being adapted to feed the material longitudinally of the casing then radially relative to the mixing blades and a water-cooled lining within the casing having a portion thereof arcuately shiftable for closing said opening.

23. In a rubber masticator of the character described, a casing having a material receiving opening and a material discharging opening, feeding apparatus arranged exteriorly of the casing for forcefully feeding material thereinto, concentrically operative shafts carrying blades disposed within the casing, means for driving said shafts and said feeding device, said feeding device being adapted to feed the material longitudinally of the casing then radially relative to the mixing blades, and a water-cooled lining within the casing having a part thereof shiftable to close the casing discharge opening and power driven means for shifting said part of the lining.

24. In a rubber masticator of the character described, a casing having a discharge opening, feeding apparatus arranged exteriorly of the casing for forcefully feeding the material through a material inlet opening of the casing, concentrically operative shafts carrying blades disposed within the casing, means for driving said shafts and said feeding device, said feeding device being adapted to feed the material longitudinally of the casing, a door for closing the discharge opening and power means for operating said door.

25. In a masticator, the combination of two groups of concentrically rotatable mixing blades having concentrically formed surfaces of considerable width and shaped to cause the material being masticated by the blades to always being urged toward the central portions of the blades relative to their longitudinal dimensions, and driving means for rotating the blades.

26. In a masticator of the character described, the combination of two groups of mixing blades, one group being mounted to be concentrically rotatable relative to the other group of blades, the respective groups of blades having concentrically formed surfaces and means for driving the blades at relatively different speeds.

27. In a rubber compounding machine of the character described, the combination of two independently rotatable groups of mixing blades, means for driving the blades, one group of blades being concave in one direction and the other group of blades being concave in the opposite direction.

28. In a rubber compounding machine of the character described, a shaft, means for driving the shaft, a group of mixing blades, fluid conducting means supporting said blades in offset relation to the shaft axis, said blades being hollow and in association with said fluid conducting means, said fluid conducting means including offset supports extending between the blades and the shaft.

29. In a rubber masticating machine of the character described, the combination of two groups of concentrically rotatable blades, one group of blades being mounted upon a shaft in offset relation to the axis of the shaft, the other group of blades extending outwardly from a second independently rotatable shaft, the outer group of blades being concavely formed in a direction opposite to the direction of rotation thereof, the second group of blades being similarly concavely formed.

30. In a rubber masticating machine of the character described, the combination of two groups of concentrically rotatable blades, one group of blades being mounted upon a shaft in offset relation to the axis of the shaft, the other group of blades extending outwardly from a second independently rotatable shaft, the outer group of blades being concavely formed in a direction opposite to the direction of rotation thereof, the second group of blades being similarly concavely formed, each group of blades having arcuate surfaces concentrically formed relative to the arcuate surfaces on the other group, each blade of the outer group having the forward side thereof tapered relative to its direction of rotation.

31. In a rubber compounding machine of the character described, the combination of two concentrically rotatable elements comprising an inner group and an outer group of rotating blades, the outer group of blades being formed in the fashion of a rotating cage adapted to be rotated around the inner group, the shape of the blades comprising the inner group being concave relative to the longitudinal dimension thereof, whereby each blade comprises a warped rib receding relative to the direction of rotation thereof from its two ends toward the middle thereof, the outer group of blades being shaped to be warped in an opposite direction relative to the direction of rotation thereof, said outer group of blades being formed to provide rubber trapping space between the inner and outer group of blades whereby material being compounded may first be trapped by a pair of cooperating blades of the respective groups and thereafter submitted to a rubbing action between the rotatably adjacent surfaces thereof.

32. In a compounding machine of the character described, two groups of relatively rotatable blades, one group comprising an outer frame work rotating about an inner group of blades formed on a shaft, the blades in one group being concavely formed in one direction, the blades in the other group being concavely formed in the opposite direction with the rotatably adjacent surfaces of the respective groups of blades, forming concentrically extending surfaces between which the material to be mixed may be submitted to a rubbing action, the outer group of blades having the forward surfaces thereof, rotatably speaking, sloping toward the center of the blade structures.

33. In a rubber compounding machine of the character described, the combination of two concentrically rotatable elements comprising an inner group and an outer group of rotating blades, the outer group of blades being formed in the fashion of a rotating cage adapted to be rotated around the inner group with at least one blade of the outer group removable, whereby the inner group of blades may be placed within the outer group of blades.

In testimony whereof, I hereunto affix my signature.

PARK E. WELTON.